United States Patent
Ghadge

(10) Patent No.: US 9,183,231 B2
(45) Date of Patent: Nov. 10, 2015

(54) INTERACTIVE TABLE TO PRESENT MULTI-LEVEL RELATIONSHIPS BETWEEN DATA ITEMS

(71) Applicant: Nishant Ghadge, Ulhasnagar (IN)

(72) Inventor: Nishant Ghadge, Ulhasnagar (IN)

(73) Assignee: SAP SE, Walldorf (DE)

( * ) Notice: Subject to any disclaimer, the term of this patent is extended or adjusted under 35 U.S.C. 154(b) by 193 days.

(21) Appl. No.: 13/688,240

(22) Filed: Nov. 29, 2012

(65) Prior Publication Data

US 2014/0149469 A1    May 29, 2014

(51) Int. Cl.
*G06F 17/30* (2006.01)

(52) U.S. Cl.
CPC .... *G06F 17/30289* (2013.01); *G06F 17/30554* (2013.01); *G06F 17/30991* (2013.01); *G06F 17/30994* (2013.01)

(58) Field of Classification Search
CPC .................... G06F 17/30991; G06F 17/30554; G06F 17/308696; G06F 17/30994; G06F 17/30289
USPC .................. 707/740, 805; 345/781; 715/227; 705/319
See application file for complete search history.

(56) References Cited

U.S. PATENT DOCUMENTS

| | | | | |
|---|---|---|---|---|
| 8,315,636 | B2 * | 11/2012 | Moon et al. .................. | 455/446 |
| 8,468,159 | B2 * | 6/2013 | Abrahams et al. ............ | 707/740 |
| 2003/0128212 | A1 * | 7/2003 | Pitkow ......................... | 345/440 |
| 2003/0140097 | A1 * | 7/2003 | Schloer ........................ | 709/203 |
| 2003/0146937 | A1 * | 8/2003 | Lee .............................. | 345/781 |
| 2003/0154205 | A1 * | 8/2003 | Knott ........................... | 707/100 |
| 2006/0271876 | A1 * | 11/2006 | Holmes et al. ............... | 715/771 |
| 2009/0125476 | A1 * | 5/2009 | Jager et al. ....................... | 707/1 |
| 2012/0016880 | A1 * | 1/2012 | Abrahams et al. ............ | 707/740 |
| 2012/0059767 | A1 * | 3/2012 | Uthmann ...................... | 705/319 |
| 2012/0323922 | A1 * | 12/2012 | Abrahams et al. ............ | 707/740 |
| 2014/0068404 | A1 * | 3/2014 | Stiffler et al. ................ | 715/227 |
| 2014/0100668 | A1 * | 4/2014 | Jundt et al. ..................... | 700/11 |

* cited by examiner

*Primary Examiner* — Jean M Corrielus

(57) ABSTRACT

In one embodiment, a first selection of a data item in an interactive table is received. Further, one or more data items related to the first selected data item in the interactive table are identified. The interactive table is modified to render the data items identified as related to the first selected data item. Furthermore, a second selection of a data item within the data items identified as related to the first selected data item is received and one or more data items related to the second selected data item within the data items identified as related to the first selected data item are identified. Further, the previously modified interactive table is again modified to render the data items identified as related to the second selected data item.

20 Claims, 7 Drawing Sheets

| NAMES 310 | IDENTITY NUMBER 315 | SECURITY PROFILES 320 | PROJECTS 325 |
|---|---|---|---|
| TOM 330 | I060100 | USERID & PASSWORD | CRM |
| JOHN | I056123 | TEST SECURITY PROFILE | FM |
| TONY | I045679 | CERTIFICATE | HR |
| HENRY | I057892 | SINGLE SIGN ON | SRM |
| MARY | I076235 | HENRY TEST SECURITY PROFILE | PM |
| ALEX | I027489 | | BW |
| | | | QM |

FIG. 3

| NAMES 310 | IDENTITY NUMBER 315 | SECURITY PROFILES 320 | PROJECTS 325 |
|---|---|---|---|
| TOM 330 | 1060100 | USERID & PASSWORD | CRM |
| JOHN | | TEST SECURITY PROFILE 410 | SRM |
| TONY | | SINGLE SIGN ON | QM |
| HENRY | | | PM |
| MARY | | | |
| ALEX | | | |

| NAMES 310 | IDENTITY NUMBER 315 | SECURITY PROFILES 320 | PROJECTS 325 |
|---|---|---|---|
| TOM 330 | I060400 | USERID & PASSWORD | QM |
| JOHN | | TEST SECURITY PROFILE 410 | |
| TONY | | SINGLE SIGN ON | |
| HENRY | | | |
| MARY | | | |
| ALEX | | | |

FIG. 5

INTERACTIVE TABLE TO PRESENT MULTI-LEVEL RELATIONSHIPS BETWEEN DATA ITEMS

FIELD

Embodiments generally relate to data presentation and more particularly to methods and systems to modify an interactive table for presenting multi-level relationships between data items.

BACKGROUND

Data presentation, such as data presentation in a graphical user interface (GUI) on a display device of a computer system, facilitates a user in understanding and interpreting the data. Depending on the type of data, the data is presented using different formats such as tables, maps, graphs, charts and the like. In a scenario where high-density dataset has to be presented, tables are preferred. Presently, tabular representation of data suffers from a number of limitations that affect their usefulness. In particular, in a table having a number of rows and columns, only a few may be of interest to the user. Further, in-line table controls that allow users to filter table information and to re-arrange the table format limit the presentation of data based on manual selection of data items and do not provide relationships between the data items in the table.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 3 is an exemplary interactive table illustrating step 210 of FIG. 2, according to an embodiment.

FIG. 5 is an exemplary modified interactive table illustrating step 260 of FIG. 2, according to an embodiment.

DETAILED DESCRIPTION

Embodiments of techniques to modify an interactive table for presenting multi-level relationships between data items are described herein. According to various embodiments, the interactive table includes a plurality of cells arranged in rows and columns including data items to present data in a structured format. The data items can be data stored in a database associated with a business object of an application. The data item may include, but not limited to, alphabets, numbers, special characters and any combination thereof. Further, the interactive tables can be used both in stand-alone computer environments and on a network such as the Web. According to one embodiment, data items in the interactive table are displayed based on a user selection of a particular data item and relationships between the selected data item and other data items in the interactive table. In other words, the data items related to the user selected data item are presented. Therefore, the multi-level relationships between the data items in the interactive table can be easily visualized.

Reference throughout this specification to "one embodiment", "this embodiment" and similar phrases, means that a particular feature, structure, or characteristic described in connection with the embodiment is included in at, least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
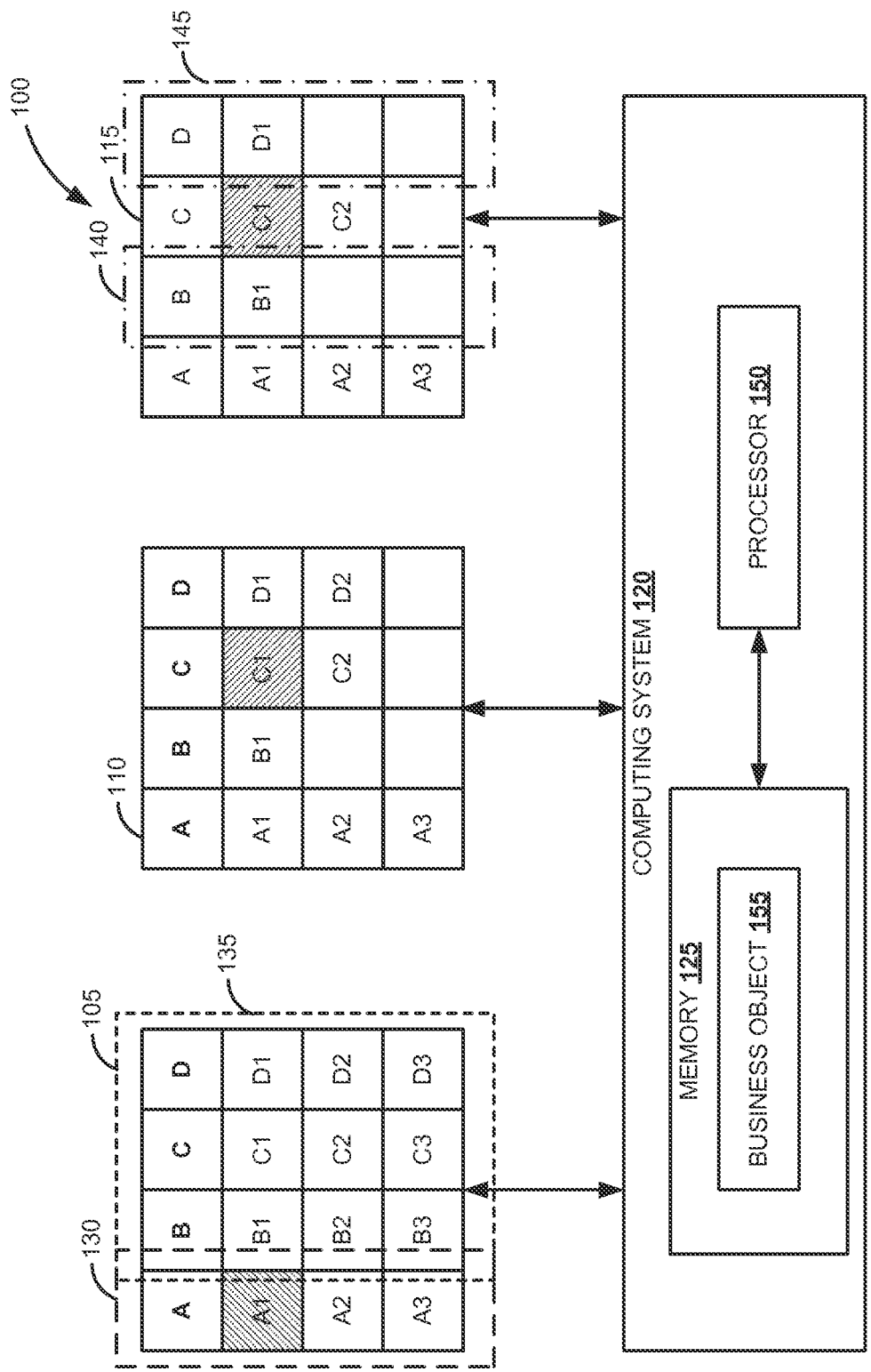
FIG. 1 is a block diagram illustrating modifying an interactive table, according to an embodiment.

FIG. 1 is block diagram 100 illustrating modifying an interactive table, according to an embodiment. The block diagram 100 shows different versions of the interactive table (e.g., 105, 110 and 115) as per user selection of data items and other data items related to the selected data items. According to one embodiment, the interactive table 105 is generated by a processor 150 of a computing system 120) based on data items associated with a business object 155. The business object 155 may reside in the memory 125 of the computing system 120. For example, the business object 155 may include, but is not limited to an identity management business object including data items related to employees of an organization and a mobile administration business object including data items related to different profiles of the employees in the organization. The interactive table 105 depicts all possible data items (e.g., A1, A2, A3, B1, B2, B3, C1, C2, C3, D1, D2 and D3) associated with the business object 155. However, the data items within the business object may or may not be related to each other. Further, a user may be interested in displaying only a subset of a set of related data items. For example, the user may be interested in the data item A1 and the related data items of A1.

In one embodiment, the user is provided an option to select a first data item in the interactive table 105. Further, for the selected first data item, related data items in the interactive table 105 are identified. For example, the first data item A1 associated with a column A (e.g., 130) of the interactive table 105 is selected. Upon receiving the selection of the first data item A1, data items (e.g., B1, C1, C2, D1 and D2) related to the first data item A1 are identified. The identified data items (e.g., B1, C1, C2, D1 and D2) are associated with at least one of the other columns (e.g., 135 including columns B, C and D) of the interactive table 105. Furthermore, the interactive table 105 is modified to include the identified data items (e.g., B1, C1, C2, D1 and D2) as shown in the interactive table 110. Also, the column A (e.g., 130) corresponding to the selected first data item A1 is retained in the modified interactive table 110. Therefore, the first level of relationships between the selected first data item (e.g., A1) and the data items (e.g., B1, C1, C2, D1 and D2) can be easily visualized.

Further, even though the identified data items (e.g., B1, C1, C2, D1 and D2) are related to the first data item A1, the data items (e.g., B1, C1, C2, D1 and D2) may or may not be related to each other. But, they may have data items in the identified data items that they are related individually. So the user may further desire to drill down to view such data items that are related to the data items identified as being related to the first selected data item (e.g., B1, C1, C2, D1 and D2) while also retaining the relationship with the first data item (e.g., A1).

In one embodiment, the user is provided an option to select a second data item from the set of the data items identified as being related to the first selected data item. Based on the selection, data items related to the second selected data item in the identified data items are identified and presented as shown in interactive table 115. For example, if the second data item C1. is selected in the identified data items (e.g., B1, C1, C2, D1 and D2), the data items (e.g., B1 and D1 associated with columns 140 and 145) related to the second selected data item C1 are automatically identified and presented. Further, the column (e.g., column A) associated with the first selected data item A1 and a column (e.g., column C) associated with the second selected data item C1 are retained in the interactive table 115. In this manner, the second level of relationships between the first selected data item (e.g., A1), the second selected data item (e.g., C1) and the data items (e.g., B1 and D1) further related to the second data item (e.g., C1) can be easily visualized. Therefore, the multi-level relationships between the data items in the interactive table can be visualized. The method of modifying interactive table to present multi-level relationships between the data items is described in greater detail in FIG. 2.

Figure 2:
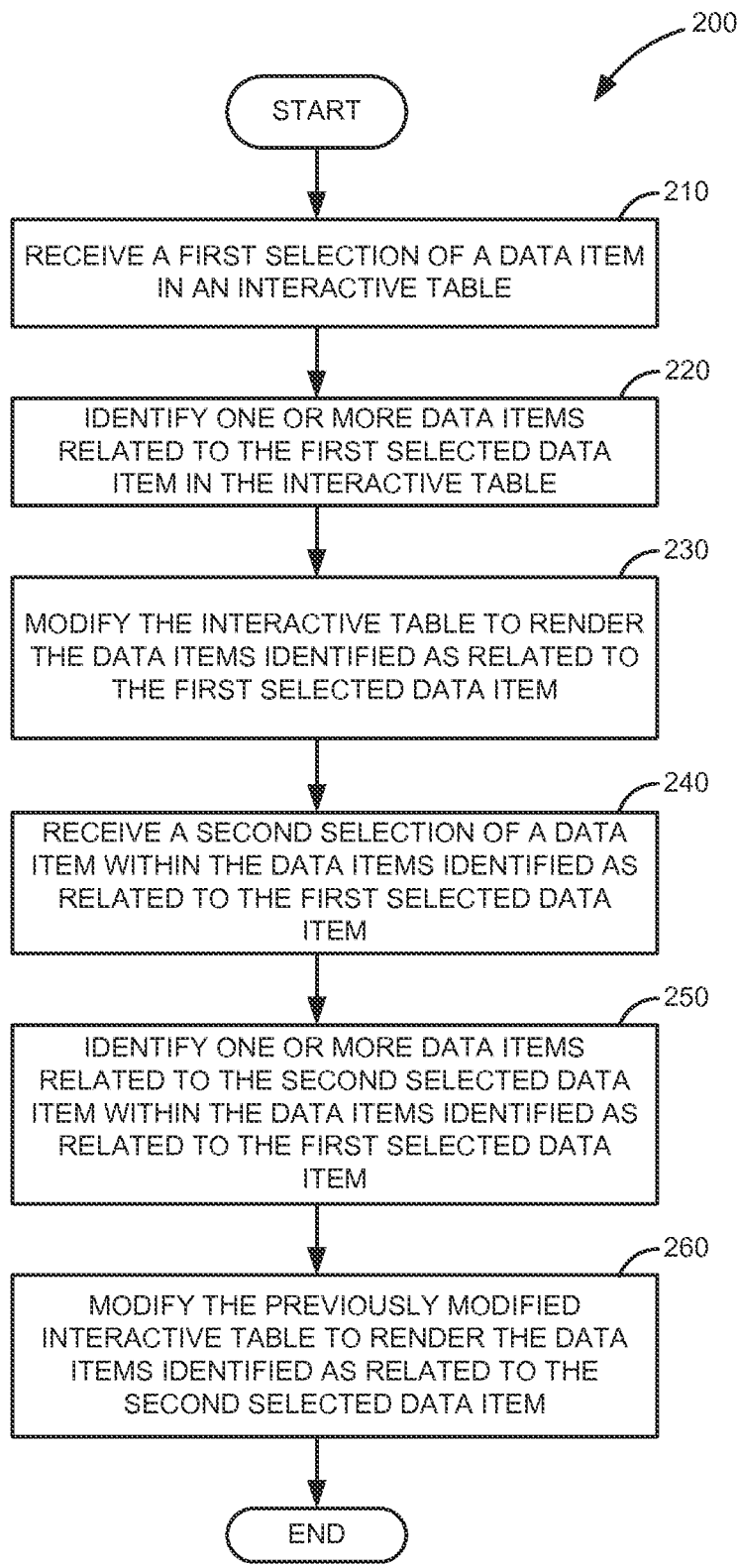
FIG. 2 is a flow diagram illustrating a method to modify an interactive table to present multi-level relationships between data items, according to an embodiment.

FIG. 2 is a flow diagram 200 illustrating a method to modify an interactive table to present multi-level relationships between data items, according to an embodiment. For example, an identity management business object includes a large set of data pertaining to different attributes such as employee name, identity number, age, project details, address, security profiles of the employees and the like. Presenting such data in a tabular layout makes the table lengthy and visualizing relationships between the attributes to analyze the data may not be feasible. In one embodiment, the data in the identity management business object is depicted in the interactive table which helps to visualize the relationships between the data items. For example, in FIG. 3, an interactive table 300 illustrates all possible data in the identity management business object through attributes such as 'names' 310, 'identity number' 315, 'security profiles' 320 and 'projects' 325. However, the relationships between the data items, i.e., which employee (e.g., 'Tom', 'John', 'Tony', 'Henry', 'Mary' and 'Alex') includes which security profile (e.g., 'userID & password', 'test security profile', 'certificate', 'single sign on' and 'henry test security profile') in which project (e.g., customer relationship management 'CRM', finance management 'FM', human resource management 'HR', supplier relationship management 'SRM', production management 'PM', business warehouse 'BW' and quality management 'QM') is not presented in the interactive table 300.

At step 210, a first selection of a data item in the interactive table is received. For example, in the interactive table 300, a first data item 'Tom' 330 is selected as shown in FIG. 3. At step 220, one or more data items related to the first selected data item in the interactive table are identified. In one exemplary embodiment, the data items are identified by analyzing a business object associated with the interactive table. For example in FIG. 3, the data items related to the first selected data item 'Tom' 330 are identified. In the example, data item 'I060100' in the column 'identity number' 315, data items 'user ID & password', 'test security profile' and 'single sign on' in the column 'security profiles' 320, and data items 'CRM', 'SRM', 'QM' and 'PM' in the column 'projects' 325, which are related to the first data item 'Tom' are identified. In other words, the column 'names' 310 is considered as the key column and the data items related to the data item 'tom' 330 are identified in the other columns (e.g., identity number' 315, 'security profiles' 320 and 'projects' 325) of the interactive table 300.

At step 230, the interactive table is modified to render the data items identified as related to the first selected data item to present relationships between the first selected data item and the data items identified as related to the first selected data item. For example, the identified data items (e.g., 'I060100', 'user ID & password', 'test security profile' 'single sign on', 'CRM', 'SRM', 'QM' and 'PM') are rendered with respect to one of 'identity number' 315, 'security profiles' 320 and 'projects' 325 colunms of an interactive table as shown in the modified interactive table 400 of FIG. 4. Further, the column corresponding to the first selected data item (e.g., 'names' 310) is retained in the modified interactive table 400. Therefore, the first level of data items related to the first selected data item 'Tom' 330 are presented. In other words, an employee by name 'Tom' having 'identity number' I060100. is assigned three different types of security profiles (e.g., userID & password, test security profile and single sign on) for four projects (e.g., CRM, SRM, QM and PM) can be easily analyzed through the modified interactive table 400.

Figure 4:
FIG. 4 is an exemplary modified interactive table illustrating steps 230 and 240 of FIG. 2, according to an embodiment.

At step 240, a second selection of a data item within the data items identified as related to the first selected data item is received. For example, in the modified interactive table 400, a second data item 'test security profile' 410 is selected as shown in FIG. 4. At step 250, one or more data items related to the second selected data item within the data items identified as related to the first selected data item are identified. In one exemplary embodiment, the data items are identified by analyzing the business object associated with the interactive table. For example, the data items in the columns pertaining to 'identity number' 315 and 'projects' 325 of FIG. 4 are analyzed to identify the data items related to the second selected data item 'test security profile' 410. In the example, data item 'I060100' in the column 'identity number' 315 and data item 'QM' in the column 'projects' 325, which are related to the second selected data item 'test security profile' 410 are identified.

At step 260, the previously modified interactive table is again modified to render the data items identified as related to the second selected data item to present relationships between the first selected data item, the second selected data item and the data items identified as related to the second selected data item. For example, the identified data items 'I060100' and 'QM') related to the second selected data item 'test security profile' 410 are rendered with respect to one of 'identity number' 315 and 'projects' 325 columns of the interactive table as shown in the modified interactive table 500 of FIG. 5. Further, the column corresponding to the first selected data item (e.g., column 'names' 310 of FIG. 4) and the column corresponding to the second selected data item (e.g., column 'security profiles' 320 of FIG. 4) are retained in the modified interactive table 500. Therefore, the second level of relationships between the first selected data item, the second selected data item and the data items identified as related to the second selected data item can be easily visualized in the interactive table. In other words, the security profile 'test security profile' 410 assigned to 'Tom' 330, with identity number 'I060100', to the project 'QM' can be easily visualized.

In one embodiment, modifying the interactive table includes displaying the modified interactive table on a computer generated graphical user interface. Further, the computer generated graphical user interface includes an option to add and delete the data items in the modified interactive tables to establish new relationships between the data items, which is described with an example in FIG. 6.

Figure 6:
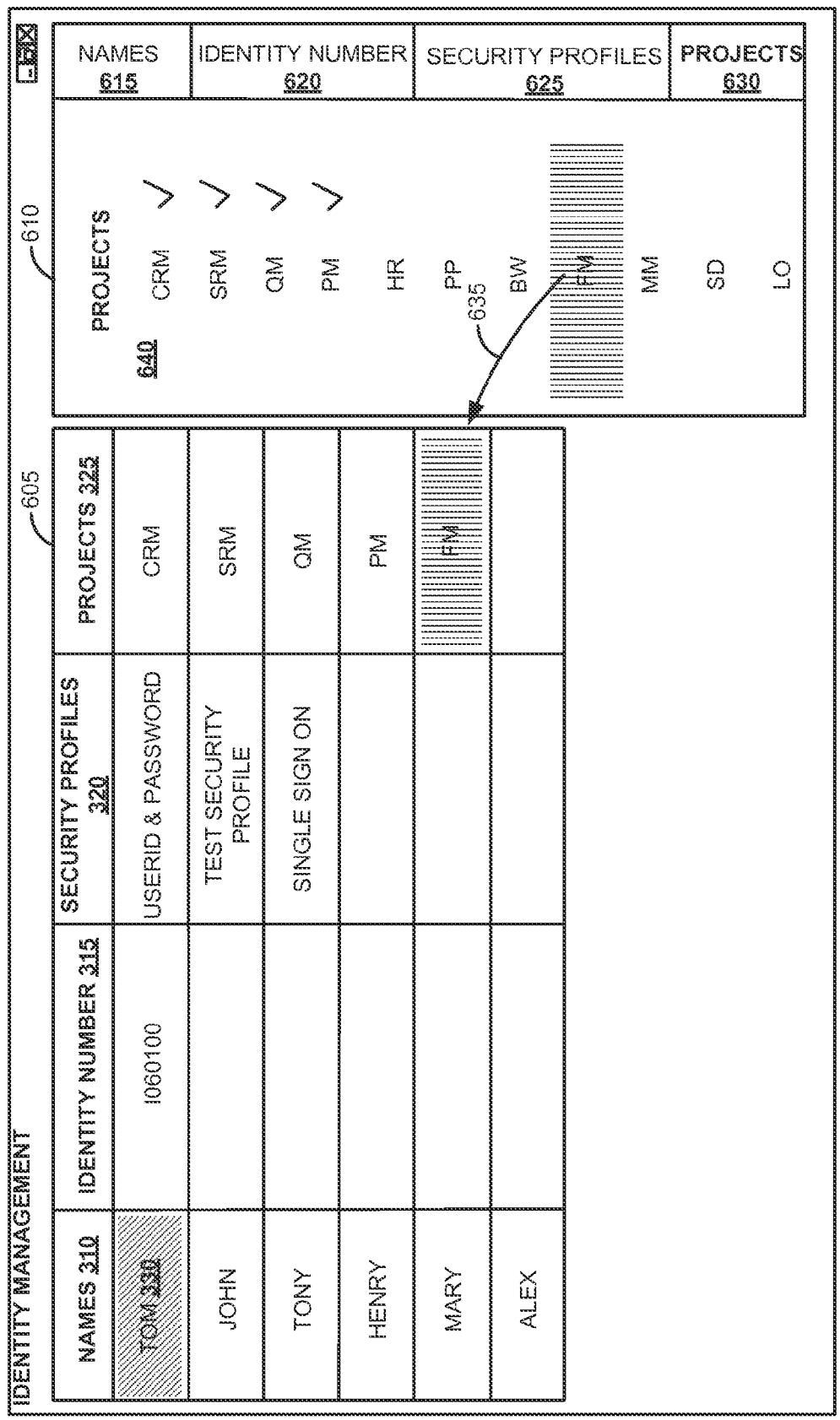
FIG. 6 is an exemplary user interface illustrating a method of adding data items to a modified interactive table, according to an embodiment.

FIG. 6 is an exemplary user interface 600 illustrating a method of adding data items to a modified interactive table 605, according to an embodiment. For example, the modified interactive table 605 can be, but is not limited to the modified interactive table 400 of FIG. 4 and the modified interactive table 500 of FIG. 5. In the example, the modified interactive table 605 depicts the modified interactive table 400 of FIG. 4. In one embodiment, an additional portion 610 is associated with the modified interactive table 605. Further, the additional portion includes all data items of each attribute in a business object associated with the interactive table. For example, the additional portion 610 includes all possible data items of an identity management business object such as 'names' 615, 'identity number' 620, 'security profiles' 625 and 'projects' 630. In one embodiment, an option is provided to select a particular attribute of the business object. In the example, the attribute 'projects' 630 is selected and accordingly, a list of all possible projects in the identity management business object is displayed at 640.

The additional portion 610 facilitates modification, addition and/or deletion of the data items in the interactive table 605. For example, a column 'projects' 325 in the interactive table 605 originally included 'CRM', 'SRM', 'QM' and 'PM'. In one exemplary embodiment, other projects can be added by dragging the data items from the additional portion 610 to the interactive table 605 as shown in 635 (e.g., project finance management 'FM' is included by dragging the 'FM' to the column 'projects' 325). Therefore, the data items to the interactive table can be easily added and/or deleted from the modified interactive table 605 and the modification is reflected in the business object associated with the interactive table.

In one embodiment, a functionality to make the table easier to use by providing quick understanding of relationships between data items is described. Further, a separate additional portion can be used to show the complete resource pool from which simple user interaction such as drag and drop, and the like can be used to establish new relationships between the data items.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
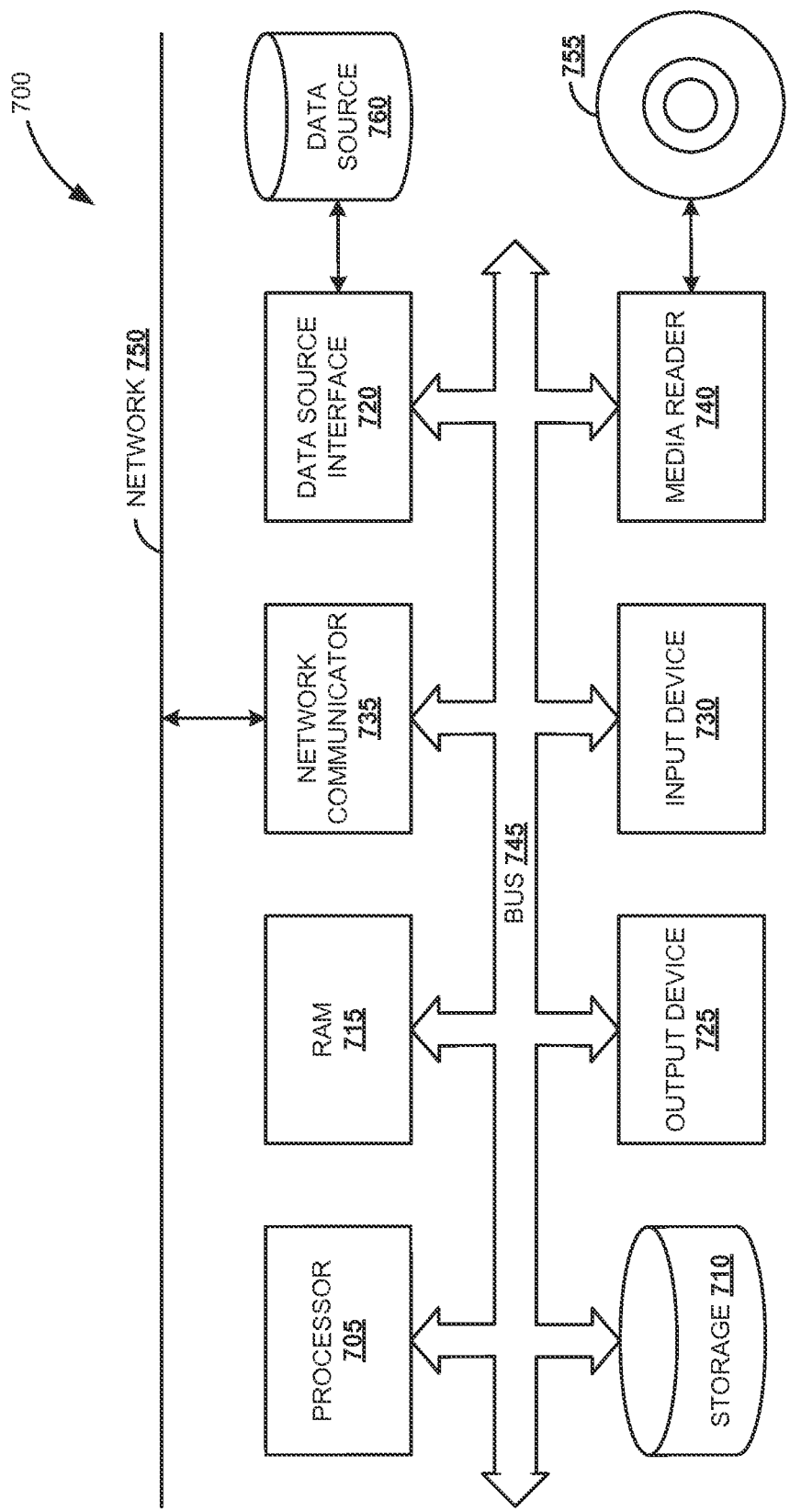
FIG. 7 is a block diagram of an exemplary computer system, according to an embodiment.

FIG. 7 is a block diagram of an exemplary computer system 700, according to an embodiment. The computer system 700 includes a processor 705 that executes software instructions or code stored on a computer readable storage medium 755 to perform the above-illustrated methods. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750, in some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. An article of manufacture including a non-transitory computer readable storage medium to store instructions, which when executed by a computer, cause the computer to:
receive a selection of a first data item in an interactive table, wherein the selected first data item is associated with a first column of the interactive table;
identify data items in the interactive table, related to the selected first data item, wherein the identified data items are associated with a plurality of other columns of the interactive table;
modify the interactive table to render, in the plurality of other columns, only the associated data items identified as related to the selected first data item to present a first level of relationships between the selected first data item and the data items identified as related to the selected first data item;
receive a selection of a second data item within the data items identified as related to the selected first data item, wherein the selected second data item is associated with a second column of the plurality of other columns of the interactive table;
identify one or more data items related to the selected second data item within the data items identified as related to the selected first data item, wherein the identified one or more data items are associated with at least one remaining column of the plurality of other columns of the interactive table; and
modify the previously modified interactive table to render, in the at least one remaining column of the plurality of other columns, only the associated one or more data items identified as related to the selected second data item to present a second level of relationships between the selected first data item, the selected second data item and the one or more data items identified as related to the selected second data item.

2. The article of manufacture of claim 1, wherein modifying the interactive table further comprises retaining the first column associated with the selected first data item in the interactive table.

3. The article of manufacture of claim 1, wherein modifying the previously modified interactive table further comprises retaining the first column associated with the selected first data item and the second column associated with the selected second data item in the interactive table.

4. The article of manufacture of claim 1, wherein the data items related to the selected first data item and the one or more data items related to the selected second data item are identified by analyzing a business object associated with the interactive table.

5. The article of manufacture of claim 1 further comprising rendering the interactive table on a computer generated graphical user interface.

6. The article of manufacture of claim 5, wherein the computer generated graphical user interface further comprises an option to add or delete a data item in the interactive table.

7. The article of manufacture of claim 6, wherein adding or deleting the data item in the interactive table further comprises modifying a business object associated with the interactive table.

8. A computer implemented method to provide an interactive table presenting multi-level relationships between data items, the method comprising:
receiving a selection of a first data item in the interactive table, wherein the selected first data item is associated with a first column of the interactive table;
identifying data items in the interactive table, related to the selected first data item, wherein the identified data items are associated with a plurality of other columns of the interactive table;
modifying the interactive table to render, in the plurality of other columns, only the associated data items identified as related to the selected first data item to present a first level of relationships between the selected first data item and the data items identified as related to the selected first data item;
receiving a selection of a second data item within the data items identified as related to the selected first data item, wherein the selected second data item is associated with a second column of the plurality of other columns of the interactive table;
identifying one or more data items related to the selected second data item within the data items identified as related to the selected first data item, wherein the identified one or more data items are associated with at least one remaining column of the plurality of other columns of the interactive table; and
modifying the previously modified interactive table to render, in the at least one remaining column of the plurality of other columns, only the associated one or more data items identified as related to the selected second data item to present a second level of relationships between the selected first data item, the selected second data item and the one or more data items identified as related to the selected second data item.

9. The computer implemented method of claim 8, wherein modifying the interactive table further comprises retaining the first column associated with the selected first data item in the interactive table.

10. The computer implemented method of claim 8, modifying the previously modified interactive table further comprises retaining the first column associated with the selected first data item and the second column associated with the selected second data item in the interactive table.

11. The computer implemented method of claim 8, wherein the data items related to the selected first data item and the one or more data items related to the selected second data item are identified by analyzing a business object associated with the interactive table.

12. The computer implemented method of claim 8 further comprising rendering the interactive table on a computer generated graphical user interface.

13. The computer implemented method of claim 12, wherein the computer generated graphical user interface further comprises an option to add or delete a data item in the interactive table.

14. The computer implemented method of claim 13, wherein adding or deleting the data item in the interactive table further comprises modifying a business object associated with the interactive table.

15. A computer system to provide an interactive table presenting multi-level relationships between data items, the computer system comprising:
at least one processor; and
one or more memory devices communicative with the at least one processor, wherein the one or more memory devices store instructions to:
receive a selection of a first data item in the interactive table, wherein the selected first data item is associated with a first column of the interactive table;
identify data items in the interactive table, related to the selected first data item, wherein the identified data items are associated with a plurality of other columns of the interactive table;
modify the interactive table to render, in the plurality of other columns, only the associated data items identified as related to the selected first data item to present a first level of relationships between the selected first data item and the data items identified as related to the selected first data item;
receive a selection of a second data item within the data items identified as related to the selected first data item, wherein the selected second data item is associated with a second column of the plurality of other columns of the interactive table;
identify one or more data items related to the selected second data item within the data items identified as related to the selected first data item, wherein the identified one or more data items are associated with at least one remaining column of the plurality of other columns of the interactive table; and
modify the previously modified interactive table to render, in the at least one remaining column of the plurality of other columns, only the associated one or more data items identified as related to the selected second data item to present a second level of relationships between the selected first data item, the selected second data item and the one or more data items identified as related to the selected second data item.

16. The computer system of claim 15, wherein modifying the interactive table further comprises retaining the first column associated with the selected first data item in the interactive table.

17. The computer system of claim 15, wherein modifying the previously modified interactive table further comprises retaining the first column associated with the selected first data item and the second column associated with the selected second data item in the interactive table.

18. The computer system of claim 15, wherein the data items related to the selected first data item and the one or more data items related to the selected second data item are identified by analyzing a business object associated with the interactive table.

19. The computer system of claim 15 further comprising rendering the interactive table on a computer generated graphical user interface.

20. The computer system of claim 19, wherein the computer generated graphical user interface further comprises an option to add or delete a data item in the interactive table.

* * * * *